2 Sheets—Sheet 1.

J. GRAY.

Magazine Fire-Arm.

No. 2,249.

Reissued May 22, 1866

WITNESSES:

Chas. F. Cleaver

Jos. A. Adams

INVENTOR.

Joshua Gray

N. PETERS, PHOTO-LITHOGRAPHER, WASHINGTON, D. C.

J. GRAY.
Magazine Fire-Arm.
No. 2,249.
Reissued May 22, 1866.
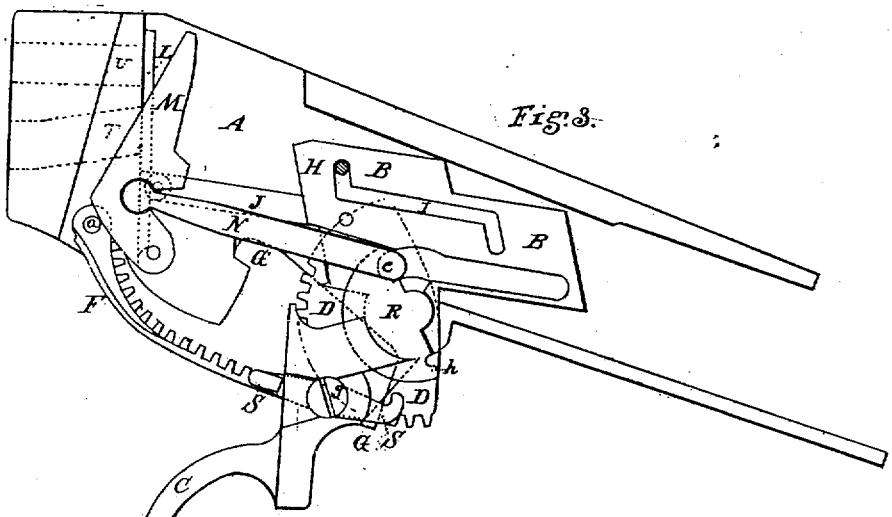
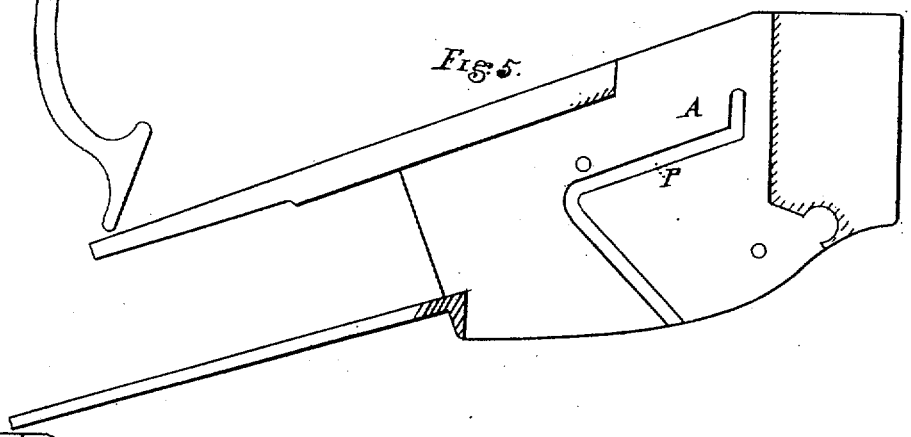
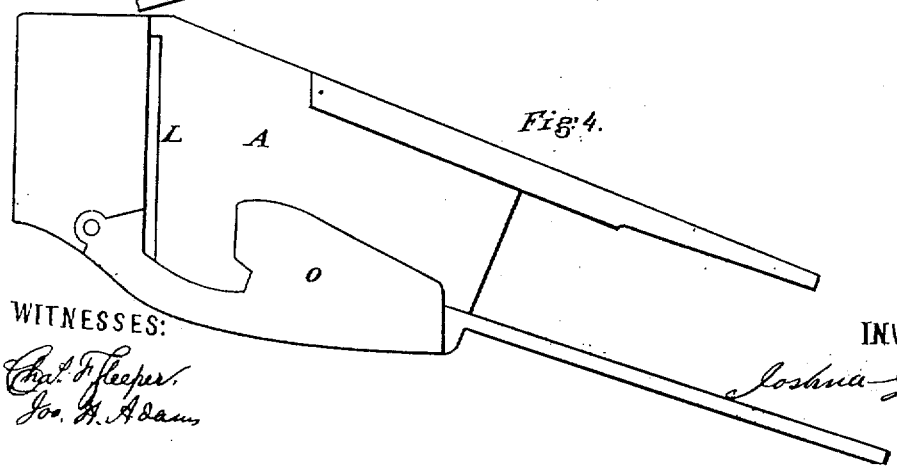
WITNESSES:
Chas. F. Keeper.
Jos. H. Adams
INVENTOR:
Joshua Gray
N. PETERS, PHOTO-LITHOGRAPHER, WASHINGTON, D. C.

UNITED STATES PATENT OFFICE.

JOSHUA GRAY, OF MEDFORD, MASSACHUSETTS, S. S. BUCKLIN, OF PROVIDENCE, RHODE ISLAND, AND WILLIAM G. LANGDON, OF MALDEN, MASSACHUSETTS, ASSIGNEES, BY MESNE ASSIGNMENT, OF JOSHUA GRAY.

IMPROVEMENT IN MAGAZINE FIRE-ARMS.

Specification forming part of Letters Patent No. 45,560, dated December 20, 1864; Reissue No. 2,249, dated May 22, 1866.

*To all whom it may concern:*

Be it known that I, JOSHUA GRAY, of Medford, in the county of Middlesex and State of Massachusetts, have invented a new and useful Improvement in Repeating and Breech-Loading Fire-Arms; and I do hereby declare that the following is a full, clear, and exact description of the construction and operation of the same, reference being had to the accompanying drawings, forming a part of this specification, in which—

Figure 1:
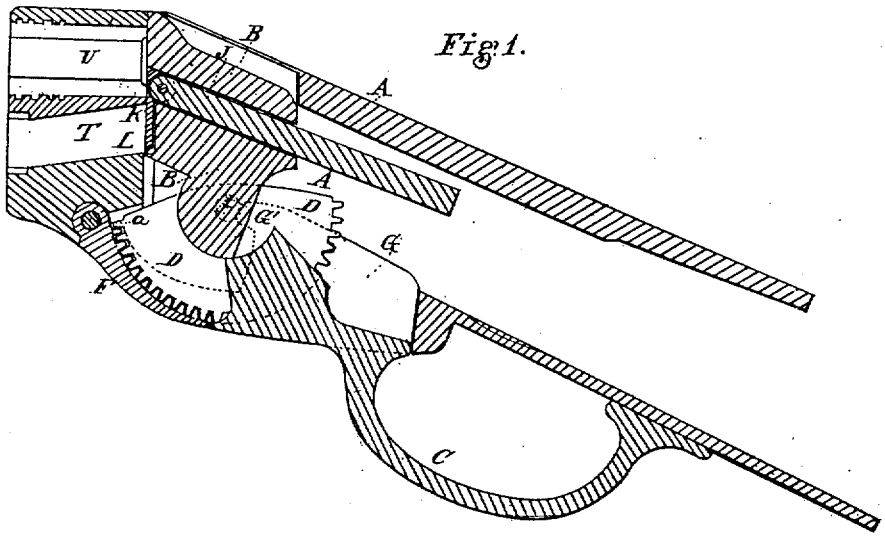
Figure 2:
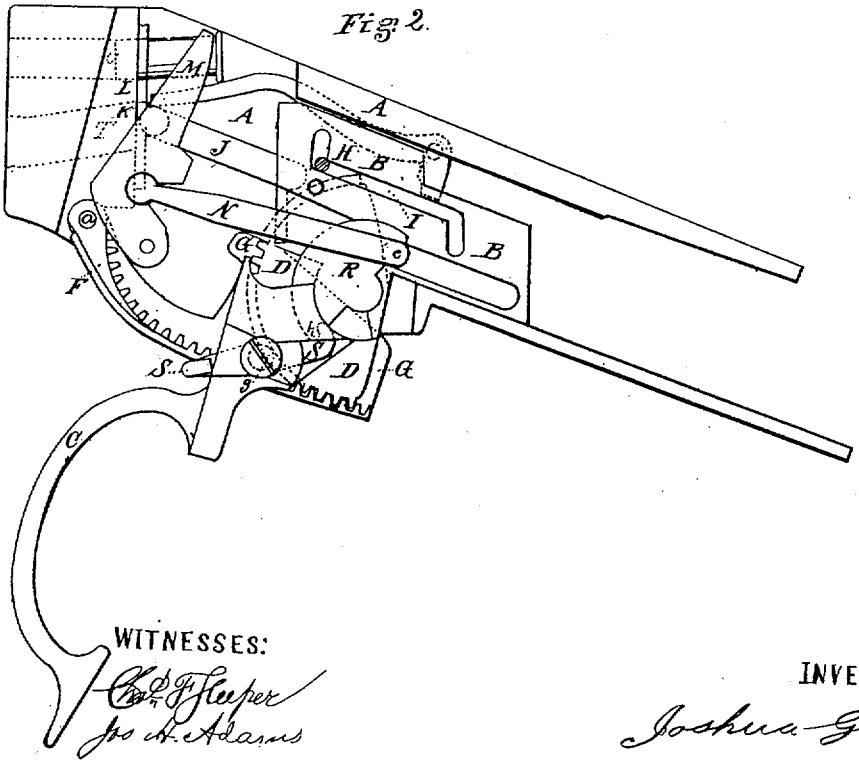

Figure 1 represents a longitudinal vertical section of the piece through the center of the breech-pin or carrier-block, showing the parts in the position in which the piece is ready to be discharged. Fig. 2 is a side elevation with the left-hand side of the receiver removed, showing the position of the parts when the piece is to be used as a breech-loader. Fig. 3 shows the same parts as in Fig. 2 in a position for loading from the magazine. Fig. 4 is an inner view of the right-hand side of the receiver, and Fig. 5 an inner view of left-hand side of the same.

Similar letters indicate like parts in the several figures.

Referring to the drawings, A represents the receiver, which is mortised to receive the breech-pin and its appendages. B is the breech-pin or carrier-block, of irregular shape, and provided with slots or grooves for the reception of pins that guide its movements. C is the guard-lever, and D is a sector-pinion forming a part of the guard-lever, or attached thereto in any suitable manner. Projecting from one side of the breech-pin B is a pin or cylindrical stud, E, which enters a central hole in the sector D, and serves as a fulcrum for the guard-lever C, a part of the breech-pin being cut away to receive the said sector, so as to form an even surface with the same.

F is a curved vibrating rack, attached at its forward end to the receiver by means of a pivot, *a*, the other end being free to vibrate according to the movement of the guard-lever. The rack F may be made stationary, the pin or projection on the guard-lever being removed. It is made, however, by preference, to vibrate, as it may then be covered by the receiver. The teeth of the sector D are made to engage with those of the rack F.

G represents an arm, or, more properly, a continuation of the rack F, and is made to slide freely in a recess, O, formed in the side of the receiver A. On the upper end of the said arm or continuation G is an enlargement or projection, $G^1$, and at the lower part of the recess O is a corresponding projection or shoulder, for the purpose of preventing the said arm or continuation from passing out of the recess, and consequently preventing the rack from dropping away from the sector.

At the side of the guard-lever is a projection or shoulder, by which the rack is carried up and held in the position represented in Fig. 1.

P represents a slot or groove formed in one side of the receiver for the purpose of receiving a pin projecting from the breech-pin, and by means of which the latter is guided in its movements, a pin, H, also serving as a guide to prevent the rear of the breech-pin from rising too high, and keeping the same in a line nearly parallel with the main body of the stock.

I is a slot or groove in the breech-pin to receive the pin H when the said breech-pin is thrown back, the pin H also serving as a fulcrum, on which the breech-pin turns downward to carry the cartridge-lifter below the port of the magazine when the piece is used as a repeater.

J represents a cartridge-lifter, consisting of a flat bar of any suitable metal, and made to slide freely in a longitudinal slot or groove in the breech-pin. To the front end of the cartridge-lifter J is hinged a flat plate of metal, K, of a size sufficient to cover the port of the magazine T. One side of the said plate K projects slightly beyond the side of the breech-pin, and slides freely in a groove, L, formed in one side of the receiver, by which means the plate K is always made to cover either the port of the barrel or that of the magazine, (excepting when a cartridge is being taken from the latter,) whatever may be the position of the breech-pin.

When the piece is to be used as a breech-loader, and not a repeater, the breech-pin is drawn back, as represented in Fig. 2, in which case the plate K operates as a cover to the port of the magazine T; but when the piece is to be used as a repeater the breech-pin is thrown a little farther back, which causes it to pitch downward and carry the top of the plate below the bottom of the magazine-port, so that a cartridge may be forced from the magazine, in the usual manner, upon the carrier, by which it is raised to the barrel U and forced into the same as the breech-pin approaches the position shown in Fig. 1.

M represents a cartridge-extractor, consisting of a thin blade of metal entering a slot at the side of the barrel and allowed to vibrate on a pivot at its lower end, the design of this device being to extract the metallic case of the cartridge left in the barrel after the discharge of the piece. The blade M is drawn out from the slot by means of an arm, N, which latter is attached at one end to the blade M by a socket-joint, the other end being provided with a cylindrical projection, *e*, which, when the breech-pin is drawn back, as shown in Fig. 2, strikes against a shoulder or the end of a recess in the breech-pin, or against the edge of the cam R, as may be required. The blade M is thrown forward again by the front of the breech-pin.

R represents a cam, formed of a thin plate of metal of the shape shown in Figs. 2 and 3, and is made to turn freely on a pivot in a recess in the side of the breech-pin. It is provided at one end with a hooked projection, *h*, for a purpose presently to be explained.

S is a lever arranged in a recess in the guard-lever C, as shown in Figs. 2 and 3, and turning freely on a pivot, *g*. The outer end of this lever S extends beyond the guard-lever, so that it can be readily moved, when required, by the thumb or fingers. On the inner end of the lever S is a hook, which, when moved to the position shown in Fig. 2, will, as the guard-lever is brought down, catch upon the hook *h* on the edge of the cam R, and thus throw the opposite edge of the cam back from the magazine and barrel, so that the knob *e* on the arm N will strike against it sooner than it would otherwise do against the shoulder or edge of the recess in the breech-pin, and thus the extractor M will be drawn out, as shown in Fig. 2, and the plate K prevented from passing below the port of the magazine T, as is required when the piece is to be used as a breech-loader. When used as a repeater the breech-pin must be thrown still farther back, and the lever S is so moved that its hooked end will not catch upon the hook *h* of the cam R, and the knob *e* will not strike against the edge of the cam, but against the edge of the recess in the breech-pin, and thus the latter will be allowed to move back the required distance, turning on the pin H in the slot I.

From the above description it is obvious that the piece may be used either as a repeater or a breech-loader, or instantly be changed from one to the other, as circumstances may require.

Having thus described my invention, what I claim, and desire to secure by Letters Patent, is—

1. The rack F, arranged below the sector D, for the purpose described.
2. Moving the cartridge-carrier from the magazine to the barrel, and vice versa, by passing it through a longitudinal slot in the breech-pin and sliding the latter over it.
3. So constructing the end of the cartridge-lifter as to cover the port of the magazine when the piece is used as a breech-loader.
4. The slot L, to guide the cover or end K of the cartridge-carrier, as described.
5. The cartridge-extractor M, in combination with the arm N, provided with the knob *e*, or its equivalent, as described.
6. The cam R, in combination with the hooked lever S, or their equivalents, for the purpose of withdrawing the cartridge-case without uncovering the magazine when it is required to use the piece as a breech-loader.
7. The guide-pin H, in combination with the groove I, for stopping and guiding the breech-pin, as described.
8. The combination of a breech-loader, a cartridge-shell extractor, and a convertible magazine-stop, substantially as described.

JOSHUA GRAY.

Witnesses:
CHAS. F. SLEEPER,
JOS. H. ADAMS.